April 15, 1958     T. D. MASON     2,830,613
LIQUID DISPENSING UNIT FOR MOTOR VEHICLES
Filed Nov. 18, 1955     2 Sheets-Sheet 1
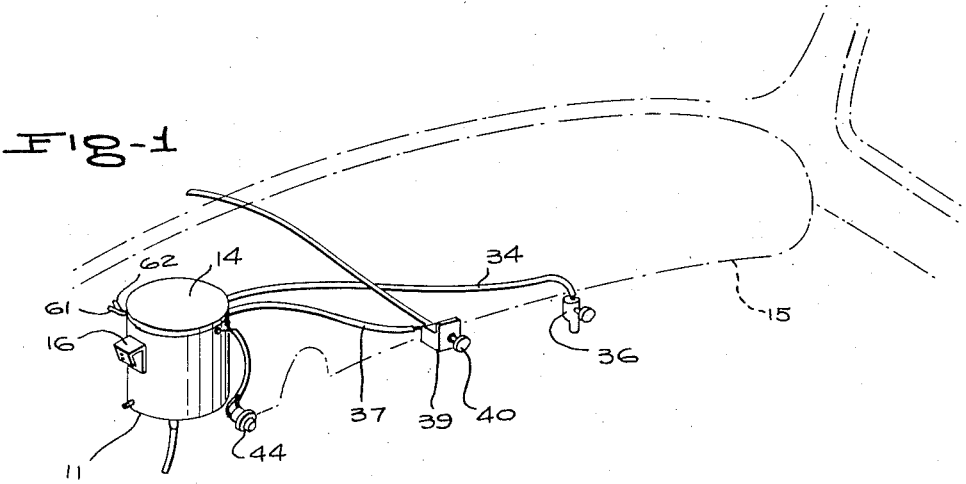
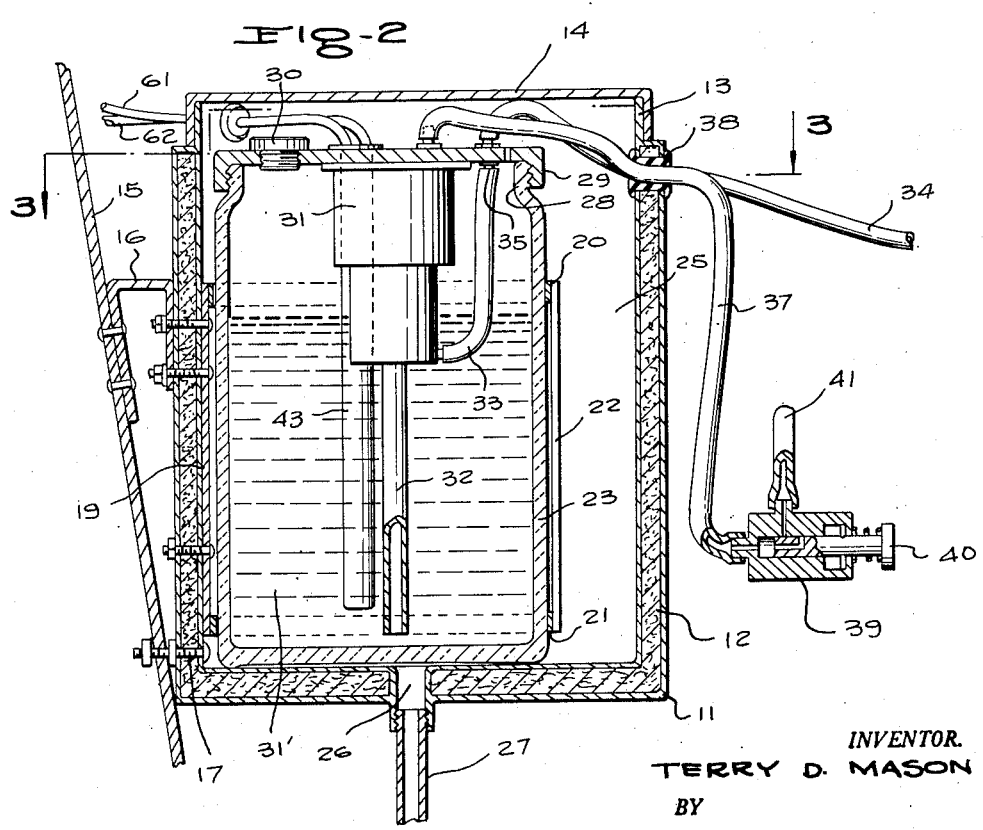
INVENTOR.
TERRY D. MASON
BY
McMorrow, Berman & Davidson
ATTORNEYS April 15, 1958     T. D. MASON     2,830,613
LIQUID DISPENSING UNIT FOR MOTOR VEHICLES
Filed Nov. 18, 1955     2 Sheets-Sheet 2
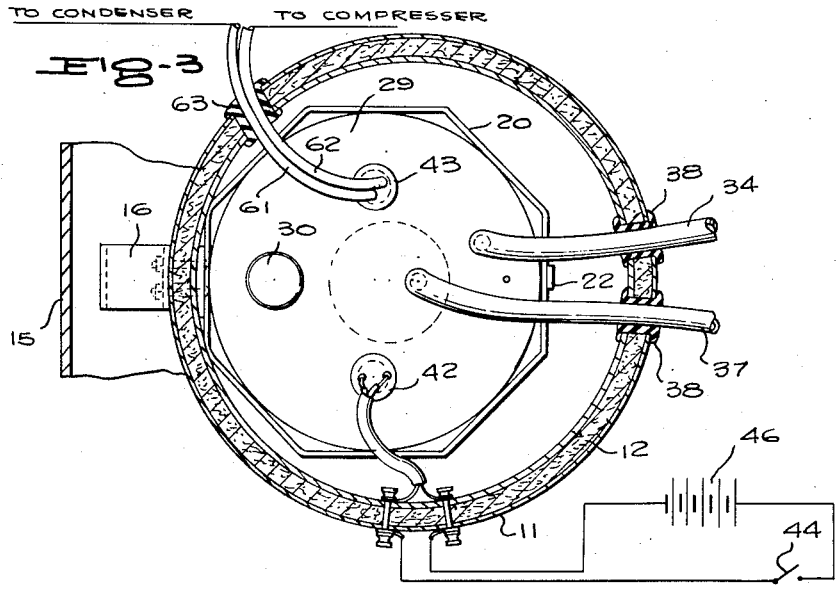
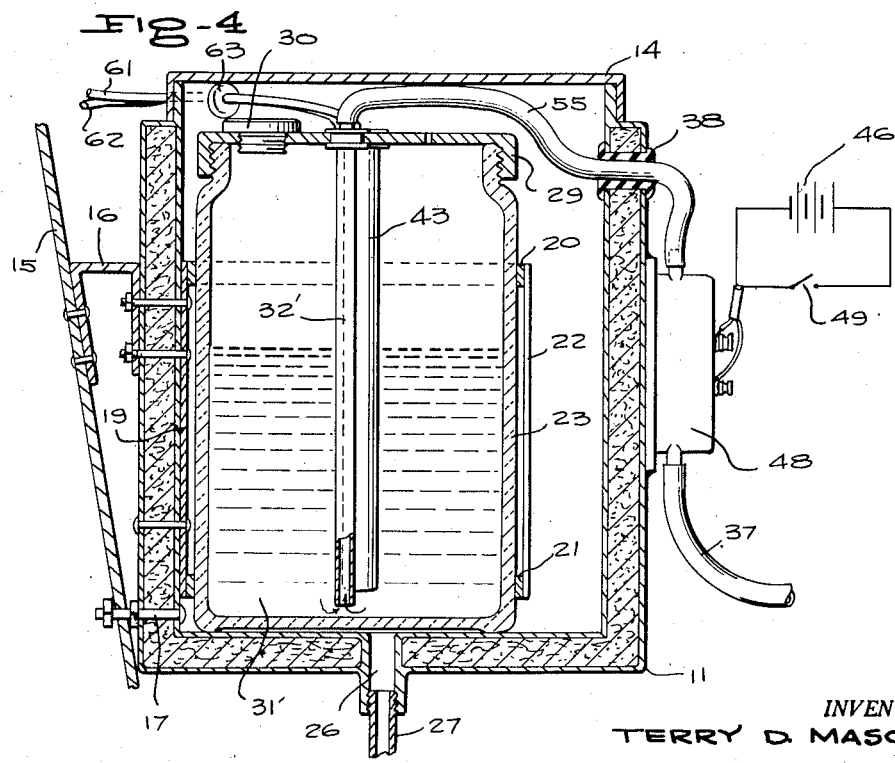
INVENTOR.
TERRY D. MASON
BY
McMorrow, Berman & Davidson
ATTORNEYS

# United States Patent Office 2,830,613
Patented Apr. 15, 1958

2,830,613

LIQUID DISPENSING UNIT FOR MOTOR VEHICLES

Terry D. Mason, Warrenton, Oreg.

Application November 18, 1955, Serial No. 547,710

2 Claims. (Cl. 137—353)

This invention relates to liquid dispensers, and more particularly to an improved liquid dispensing unit for use in a motor vehicle for dispensing hot or cold beverages.

A main object of the invention is to provide a novel and improved liquid dispensing unit for motor vehicles, said unit being simple in construction, being easy to install, and being provided with means for storing liquids at a desired temperature and for dispensing the liquids when desired by an occupant of the motor vehicle in which the device is installed.

A further object of the invention is to provide an improved beverage dispensing attachment for a motor vehicle, the dispensing attachment involving inexpensive components, being relatively compact in size, being arranged so that the liquid container thereof may be easily filled, and being provided with means for maintaining the beverage contained therein at a desired temperature.

Further objects and advantages of the invention will become apparent from the following description and claims, and from the accompanying drawings, wherein:

Figure 1 is a fragmentary diagrammatic view illustrating the manner in which an improved beverage dispensing unit according to the present invention is installed in a typical motor vehicle.

Figure 2 is an enlarged vertical cross sectional view taken transversely through the main receptacle of the liquid dispensing unit of Figure 1 and showing the internal structure of the control valve for the vacuum-operated pump element thereof.

Figure 3 is a horizontal cross sectional view taken on the line 3—3 of Figure 2.

Figure 4 is a vertical cross sectional view, similar to Figure 2, but showing a modified form of main receptacle according to the present invention.

Referring to the drawings, and more particularly to Figures 1, 2 and 3, 11 designates the main supporting receptacle of the beverage dispenser, said receptacle being of any suitable shape, for example, cylindrical, as illustrated, and comprising a jacket containing suitable insulation material 12, the top of the container 11 having the upstanding annular flange 13 adapted to receive the cover 14 thereover, in the manner shown in Figure 2. The cover 14 is readily removable to provide access to the interior of the main supporting receptacle 11. As shown in Figure 2, said main receptacle 11 may be secured to a suitable supporting surface of the vehicle, for example, to the instrument panel or dashboard 15, as by the use of an upper generally U-shaped bracket 16 connecting the wall of the receptacle 11 to the dashboard 15 and a lower bolt 17 connecting the lower portion of the wall of the container to said dashboard. Thus, the receptacle 11 may be rigidly supported in a vertical position on the inclined dashboard 15. Obviously, if the dashboard 15 is vertical, the upper bracket 16 need not be employed and the receptacle may be merely fastened to the vertical dashboard by a plurality of spaced bolts 17.

Designated at 19 is a vertical supporting bar which is secured to the internal wall surface of the receptacle 11. Secured to the top and bottom ends of the bar 19 are the respective vertically aligned, horizontal bracket loops 20 and 21, said bracket loops being rigidly secured in parallel relationship to each other by a vertical rod element 22 located diametrically opposite the vertical rod element 19. As shown in Figure 3, the loops 20 and 21 are preferably polygonal in shape, for example, octagonal, and are substantially smaller in width than the inside diameter of the receptacle 11. Designated at 23 is a liquid container, for example, a glass jar, which is received in the loops 20 and 21 and which is thus supported in the main receptacle 11 in spaced relationship with respect to the major portion of the inside surface of the main container to define a space 25 between the liquid receptacle 23 and the inside wall surface of the main container adapted to receive suitable refrigerating material, such as ice, or the like.

The bottom wall of the main container 11 is provided with a central drain opening 26 to which is connected a suitable drain conduit 27 leading to the exterior of the motor vehicle.

The container 23 is formed with the threaded top rim 28 on which is engaged the cover 29, the cover 29 having internal threads engageable with the threads on the top rim 28, as is clearly shown in Figure 2. The cover 29 is provided with the removable filler plug 30, which, when removed, allows the container 23 to be filled with beverage 31'.

Centrally secured to the cover 29 and depending therefrom into the container 23 is a vacuum-operated liquid pump 31 provided with the depending intake conduit 32 and the outlet conduit 33 which is connected to a beverage discharge conduit 34, by means of a nipple element 35 secured in and extending through the cover 29. The discharge conduit 34 leads to a spigot 36 secured to the dashboard 15 at a suitable location thereon.

The vacuum-operated pump 31 is driven from the intake manifold suction of the motor vehicle, being connected to the motor vehicle intake manifold by a suitable conduit 37 extending through a bushing 38 of deformable resilient material provided in the upper portion of the wall of the main receptacle 11, conduit 37 being provided with a suitable control valve 39, as shown in Figure 2. The control valve 39 is mounted at a convenient location on the instrument panel 15, preferably adjacent to the spigot 36. As shown in Figure 2, the control valve 39 has the manually operated plunger 40 which is normally in a closed position, sealing the vacuum line, shown at 41, with respect to the conduit 37. When the plunger 40 is moved inwardly, as by exerting manual pressure thereon, the vacuum line 41 is connected to the conduit 37, operating the pump 31, whereby beverage 31' is pumped from the container 23 to the spigot 36. Thus to obtain beverage, it is merely necessary to open the spigot 36, holding a suitable drinking cup under the spigot, while at the same time pushing the valve plunger element 40 inwardly, to energize the pump 31.

As above explained, the container 23 may be refrigerated, if so desired, by providing suitable refrigerating material, such as ice, or the like, in the space 25. Instead of employing refrigerating material, the container 23 may be refrigerated by employing a refrigerating element therein comprising an evaporator unit 43 secured to and depending from the cover 29, said evaporator unit being connected to an external refrigeration machine mounted in the vehicle, by the respective refrigerant inlet and outlet conduits 61 and 62 which extend through a suitable bushing 63 provided in the wall of the main container 11. The external refrigeration machine is driven by any suitable means, preferably the vehicle engine, and may be the same refrigeration machine employed for air-conditioning the vehicle, where the vehicle is of the type provided with air-conditioning equipment.

Alternatively, the beverage 31' may be maintained at a relatively high temperature by the use of an immersion heater unit, such as the heater unit 42 shown in Figure 3. Heater unit 42 is secured to the cover 29 and depends therefrom into the beverage container 23, the heater unit having its terminals connected through a control switch 44 to the vehicle battery 46 in the manner illustrated in Figure 3, whereby said heater unit 42 may be energized by closing switch 44 to provide heat for the liquid 31'. The heater switch 44 is mounted on the dashboard 15 at a convenient location thereon, as shown in Figure 1.

In the form of the invention illustrated in Figure 4, an electrically operated pump 48 is employed instead of the vacuum-operated pump 31 of Figures 1, 2 and 3, the pump 48 is connected to the conduit 37 and the valve main receptacle 11 and being connected to a suitable source of current, for example the vehicle battery 46 through a suitable control switch 49 which may be mounted at a convenient location on the dashboard of the vehicle. A depending rigid intake conduit 32' being is centrally secured to the cover 29, the rigid conduit 32' being connected by a suitable external conduit 55 to the intake port of the pump 48. The outlet port of the pump 48 is connected to the conduit 37 and the valve 39 to the discharge spigot, as in the preceding form of the invention.

While certain specific embodiments of an improved beverage dispensing assembly for a motor vehicle have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle, a main supporting generally cylindrical receptacle, having a flat bottom wall, mounted on said vehicle, a pair of vertically spaced vertically aligned polygonal bracket loops secured in said main receptacle to the inside wall surface of said main receptacle, the transverse width of said loops being substantially less than the inside diameter of the main receptacle, to define space for refrigerating material between the loops and said inside wall surface, a generally cylindrical liquid container mounted in said bracket loops, and supported on said bottom wall, a pump mounted in said liquid container, a discharge conduit connected to the outlet of said pump, an intake conduit connecting the intake of said pump to the interior of said liquid container, and driving means on the vehicle operatively connected to said pump.

2. In a motor vehicle having an intake manifold under vacuum, a generally cylindrical main supporting receptacle having a flat bottom wall mounted on said vehicle, a pair of vertically spaced, vertically aligned, polygonal bracket loops secured in said main receptacle to the inside wall surface of said main receptacle, the transverse width of said loops being substantially less than the inside diameter of the main receptacle, to define space for refrigerating material between the loops and said inside wall surface, a generally cylindrical liquid container mounted in said bracket loops, said liquid container having a flat bottom supported on said flat bottom wall, a vacuum-operated pump mounted in said liquid container, a discharge conduit connected to the outlet of said pump, an intake conduit connecting the intake of said pump to the interior of said liquid container, conduit means operatively connecting said pump to said intake manifold, and a control valve in said last-named conduit means.

References Cited in the file of this patent

UNITED STATES PATENTS

| | | |
|---|---|---|
| 676,130 | Goodfellow | June 11, 1901 |
| 928,711 | Taft | July 20, 1909 |
| 1,444,262 | Morrison | Feb. 6, 1923 |
| 1,998,000 | Doering | Apr. 16, 1935 |
| 2,025,651 | Dolan | Dec. 24, 1935 |
| 2,478,808 | Deal | Aug. 9, 1949 |
| 2,661,015 | Allred et al. | Dec. 1, 1953 |
| 2,688,514 | Oishei et al. | Sept. 7, 1954 |
| 2,746,652 | Oishei | May 22, 1956 |